United States Patent
Jakobsson et al.

(10) Patent No.: US 7,356,696 B1
(45) Date of Patent: Apr. 8, 2008

(54) PROOFS OF WORK AND BREAD PUDDING PROTOCOLS

(75) Inventors: Bjorn Markus Jakobsson, Hoboken, NJ (US); Ari Juels, Brookline, MA (US)

(73) Assignees: Lucent Technologies Inc., Murray Hill, NJ (US); RSA Security Inc., Bedford, MA (US)

( * ) Notice: Subject to any disclaimer, the term of this patent is extended or adjusted under 35 U.S.C. 154(b) by 853 days.

(21) Appl. No.: 09/630,711

(22) Filed: Aug. 1, 2000

(51) Int. Cl.
*H04L 9/00* (2006.01)
*H04L 9/32* (2006.01)
*G06F 7/04* (2006.01)

(52) U.S. Cl. .............. 713/168; 726/6; 726/7; 726/28

(58) Field of Classification Search ........ 713/168, 713/180, 200; 705/67, 68, 69, 76
See application file for complete search history.

(56) References Cited

U.S. PATENT DOCUMENTS

| | | | |
|---|---|---|---|
| 4,183,085 A * | 1/1980 | Roberts et al. ............ 705/76 |
| 5,185,798 A * | 2/1993 | Hamada et al. ............ 705/68 |
| 5,233,513 A * | 8/1993 | Doyle ........................ 705/7 |
| 5,276,736 A * | 1/1994 | Chaum ...................... 705/69 |
| 5,768,385 A * | 6/1998 | Simon ....................... 705/69 |
| 5,768,586 A * | 6/1998 | Zweben et al. ............ 713/100 |
| 5,809,495 A * | 9/1998 | Loaiza ....................... 707/2 |
| 5,903,649 A * | 5/1999 | Schwenk ................... 713/180 |
| 5,930,777 A * | 7/1999 | Barber ....................... 705/40 |
| 5,963,914 A * | 10/1999 | Skinner et al. ............ 705/11 |
| 6,005,938 A * | 12/1999 | Banker et al. ............. 380/239 |
| 6,023,508 A * | 2/2000 | Bombard et al. .......... 705/69 |
| 6,212,549 B1 * | 4/2001 | Page et al. ................. 709/205 |
| 6,212,634 B1 * | 4/2001 | Geer et al. ................. 713/156 |
| 6,223,291 B1 * | 4/2001 | Puhl et al. ................. 713/201 |
| 6,237,097 B1 * | 5/2001 | Frankel et al. ............. 713/180 |
| 6,282,653 B1 * | 8/2001 | Berstis et al. ............. 713/200 |
| 6,338,050 B1 * | 1/2002 | Conklin et al. ............ 705/80 |
| 6,496,932 B1 * | 12/2002 | Trieger .................... 713/168 |

(Continued)

FOREIGN PATENT DOCUMENTS

WO    WO2005083926 A1 *    9/2005

OTHER PUBLICATIONS

Nguyen et al, Secure and Efficient Digital Coins, 1997, IEEE, pp. 9-15.*

(Continued)

*Primary Examiner*—Ayaz Sheikh
*Assistant Examiner*—Aravind K Moorthy

(57) ABSTRACT

The bread pudding protocol of the present invention represents a novel use of proofs of work and is based upon the same principle as the dish from which it takes its name, namely, that of reuse to minimize waste. Whereas the traditional bread pudding recipe recycles stale bread, our bread pudding protocol recycles the "stale" computations in a POW to perform a separate and useful task, while also maintaining privacy in the task. In one advantageous embodiment of our bread pudding protocol, we consider the computationally intensive operation of minting coins in the MicroMint scheme of Rivest and Shamir and demonstrate how the minting operation can be partitioned into a collection of POWs, which are then used to shift the burden of the minting operation onto a large group of untrusted computational devices. Thus, the computational effort invested in the POWs is recycled to accomplish the minting operation.

31 Claims, 4 Drawing Sheets

U.S. PATENT DOCUMENTS

| | | | | |
|---|---|---|---|---|
| 6,499,019 | B1* | 12/2002 | Yen et al. | 705/67 |
| 6,549,210 | B1* | 4/2003 | Van Hook et al. | 345/561 |
| 6,636,969 | B1* | 10/2003 | Jakobsson et al. | 713/180 |
| 6,662,167 | B1* | 12/2003 | Xiao | 706/13 |
| 6,747,692 | B2* | 6/2004 | Patel et al. | 348/211.2 |
| 6,799,277 | B2* | 9/2004 | Colvin | 713/202 |
| 6,944,765 | B1* | 9/2005 | Rose et al. | 713/181 |

OTHER PUBLICATIONS

Nguyen et al, Micro-Digital Money for Electronic Commerce, 1997, IEEE, pp. 2-8.*

Anonymous, AuthentiDate and Claimsoft Provide Electronic Construction Project Documentation Solution, 2004, p. 1.*

Blackert et al, Analyzing Interaction Between Distributed Denial of Service Attacks and Mitigation Technologies, 2003, IEEE, pp. 26-36.*

Golze et al., Fair Overload Handling Using Proof-of-Work Functions, 2006, IEEE, pp. 1-8.*

Miao Ma, Mitigating Denial of Service Attacks with Password Puzzles, 2005, IEEE, pp. 621-626.*

Mahimkar et al, Game-Based Analysis of Denial-of-Service Prevention Protocols, 2005, IEEE, pp. 281-301.*

Bowen et al, Next Generation SCADA Security: Best Practices and Client Puzzles, 2005, IEEE, pp. 426-427.*

C. Dwork and M. Naor, "Pricing via Processing or Combatting Junk Mail", *Proc. CRYPTO '92*, pp. 139-147, 1992.

R.L. Rivest and A. Shamir, "PayWord and MicroMint: Two Simple Micropayment Schemes", *CryptoBytes*, vol. 2, Issue, 1, pp. 7-11, Spring 1996.

R.L. Rivest, A. Shamir, and D. Wagner, "Time-lock Puzzles and Timed-Release Crypto", Mar. 10, 1996.

* cited by examiner

PROOFS OF WORK AND BREAD PUDDING PROTOCOLS

FIELD OF THE INVENTION

This invention relates generally to proofs of work (POW), and, more particularly, to methods for harvesting a computational effort invested in a POW to accomplish a separate, useful and verifiably correct computation.

BACKGROUND OF THE INVENTION

In many cryptographic protocols, a prover seeks to convince a verifier that he possesses knowledge of a secret or that a certain mathematical relationship holds true. For example, in the Schnorr identification protocol, the prover seeks to demonstrate possession of a secret key corresponding to a specific authenticated public key. By contrast, in a POW, a prover demonstrates to a verifier that he has performed a certain amount of computational work in a specified interval of time. Although not defined as such or treated formally in the literature, POWs have served as the basis for a number of data security applications, including, benchmarking, server access metering, construction of digital time capsules, and protection against spamming and other denial-of-service attacks. A drawback to the use of POWs, however, is the fact that they impose a significant computational load in excess of that associated with many conventional cryptographic protocols.

SUMMARY OF THE INVENTION

A technical advance is achieved in the art by providing a method for a verifier to use a computational effort invested in a proof of work for a separate operation.

An exemplary method for using a computational effort invested in a proof of work (POW) includes: distributing a task among a plurality of entities; receiving a POW relating to said task from one of said plurality of entities; and using said POW to accomplish said task.

An alternate method for using a computational effort invested in a proof of work (POW) includes: partitioning a minting operation into a plurality of sub-tasks; distributing one of said plurality of sub-tasks to one of a plurality of entities; receiving a POW from said one of said plurality of entities; and using said POW to accomplish said minting operation.

Yet an alternate method for using a computational effort invested in a proof of work (POW) includes: distributing a minting operation among a plurality of entities in a manner that maintains privacy in said minting operation; receiving a POW relating to said minting operation from one of said plurality of entities; and using said POW to accomplish said minting operation.

The bread pudding protocol of the present invention represents a novel use of proofs of work and is based on the same principle as the dish from which it takes its name, namely, that of reuse to minimize waste. Whereas the traditional bread pudding recipe recycles stale bread, a bread pudding protocol recycles the "stale" computations in a POW to perform a separate and useful operation, while also maintaining privacy in the operation. In one advantageous embodiment of a bread pudding protocol, we consider the computationally intensive operation of minting coins in the MicroMint scheme of Rivest and Shamir and demonstrate a novel minting approach by partitioning the minting operation into a collection of tasks, distributing the tasks among a large group of untrusted computational devices, and harvesting the computational effort invested in POWs relating to the tasks to perform the minting operation. Thus, this approach requires little or no capital investment in costly hardware on the part of the minter in order to accomplish the minting operation.

Other and further aspects of the present invention will become apparent during the course of the following description and by reference to the attached drawings.

DETAILED DESCRIPTION

Figure 1A:
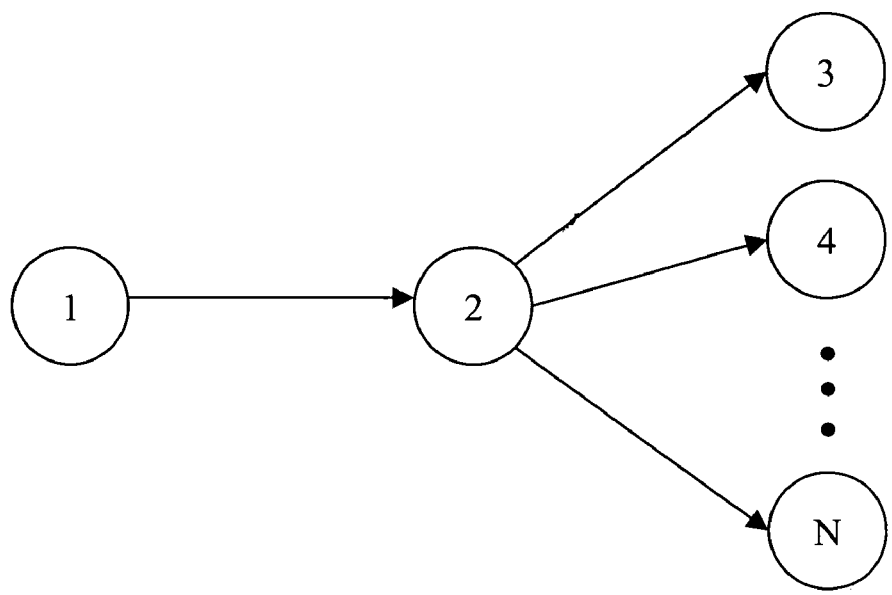
FIGS. 1A and 1B illustrate an exemplary architecture for practicing the bread pudding protocol of the present invention.
Figure 1B:
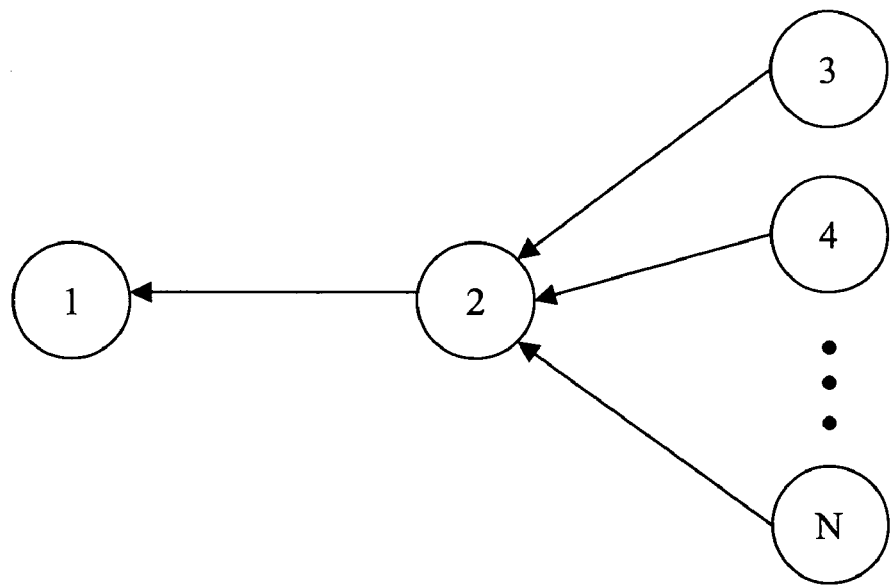

FIGS. 1A and 1B illustrate an exemplary architecture for practicing an illustrative embodiment of the bread pudding protocol of the present invention. As shown in FIGS. 1A and 1B, the architecture comprises entities 1, 2 and 3 through n (all of which may be servers). Although entity 1 is illustrated in FIGS. 1A and 1B as being distinct from entity 2, in an alternate embodiment, entities 1 and 2 may be the same entity. To begin, with reference to FIG. 1A, entity 1 has a computational task to perform. In furtherance of that task, entity 1 instructs entity 2 to perform some computational work related to the task. Entity 2 will then out-source the work related to the task to each of entities 3 through n. Outsourcing may be accomplished by dividing the work into components and assigning each entity 3 through n a different component. As shown in FIG. 1B, as each entity 3 through n completes its component of work, each entity will respond with its reply. Each of the replies is a POW (referred to herein as "POW$_1$"). Entity 2 then complies the replies into a response and transmits the response to entity 1. This response is also a POW (referred to herein as "POW$_2$"). Finally, entity 1 verifies the response.

Rather than discarding the computation in POW$_1$, however, the computation can instead be used by entity 2 to convince entity 1 to accept its POW$_2$. Thus, POW$_1$ is a bread pudding protocol for POW$_2$. Similarly, entity 1 can use the computation performed in POW$_2$ to aid in the successful completion of the task originally sought to be performed by entity 1. Thus, POW$_2$ is also a bread pudding protocol.

Before we describe in greater detail the bread pudding protocols of the present invention, we first set forth the following definitions, which, although not intended to be limiting, enable us to characterize POWs and some of their associated properties (such as hardness, soundness, efficiency and independence), and permit us to illustrate how many of these properties are present in our bread pudding protocols.

Like any other type of proof protocol, a POW may be either interactive or non-interactive. An interactive proof is a multi-round protocol executed by a prover P and a verifier V. In our consideration of POWs, we assume that both P and V may perform an arbitrary number of acts such as private coin flips during the protocol execution. At the end of the protocol, V decides either to accept or reject. If V accepts, then the protocol is successful. Otherwise, it has failed. A non-interactive proof involves only one round of communication from the prover. Let $c_V$ denote the private coin flips of V. In order to ensure the security of the proof, it is necessary to generate $c_V$ in a manner that cannot be effectively controlled by the prover. By analogy with non-interactive proofs for standard cryptographic properties, we may accomplish this by reference to a public source of randomness or by some other appropriate means such as, e.g., generating $c_V$ using the hash of some protocol-specific value. Thus, in a non-interactive proof protocol, the prover simulates a communication from the verifier, and then sends its transcript to the verifier.

An important variant on these ideas is that of an implicit POW. An implicit POW is a type of non-interactive proof protocol in which verification is not performed by a verifier, but is determined by the ability of the prover to perform a given task. For example, a correct POW transcript can serve as a decryption key for some escrowed key or document. Thus, the power or any other party is capable of verifying a correct implicit POW without the active participation of the verifier.

Let us assume in our definitions, for the sake of simplicity, that no communications latency is incurred in a POW. We define the start time $t_s$ of a POW execution to be the time at which the verifier initiates its first round of communication. The completion time $t_c$ is the time at which the last round of a POW execution is complete. The aim of a POW is to enable P to demonstrate that she has performed a certain amount of computation within the time interval $[-t_s, t_c]$. Let poly denote any polynomial in a given variable. (We use the informal notation poly(x) to denote a polynomial in the variable x, and o(1/poly(x)) to denote a quantity that is asymptotically smaller than the inverse of any polynomial in x.) Finally, let l be a security parameter. Finally, let us assume that the prover is permitted to perform an arbitrarily large amount of computation prior to the protocol execution. Thus, in fact, our definitions assume that the prover may perform computation over the time interval $[-\infty, t_c]$. We characterize the hardness of a POW using the following two definitions, where probabilities are over the coin flips of both parties, and computational steps and memory resources are as measured in any suitable model. Definition 1 provides the notion of a lower bound on POW hardness, while Definition 2 provides that of an upper bound.

Definition 1 We say that a proof of work POW is (w, p)-hard if the following is true. Suppose prover P with memory resources bounded by m performs an average, over all coin flips by P and V, of at most w steps of computation in the time interval $[t_s, t_c]$. Then the verifier V accepts with probability at most $$p + o\left(\frac{m}{poly(l)}\right),$$

where l is a security parameter.

Definition 2 We say that a proof of work POW is (w, p, m)-feasible if there exists a prover P with memory resources bounded by m such that with an average of w steps of computation in the time interval $[t_s, t_c]$, the prover can cause the verifier V to accept with probability at least p. This leads to the following definition. Note that it is possible to relax both this and the next definition to allow for, e.g., (w,l-$\epsilon$, poly(l))-feasibility where $\epsilon$ is a quantity negligible with respect to the security parameter l. For the sake of simplicity, we do not consider such definitional variants.

Definition 3 We say that a proof of work POW is sound, if, for some w, POW is (w,l,poly(l))-feasible, where l is a security parameter.

A POW may be regarded as efficient if the verifier performs substantially less computation than the prover. We say that such proof has a larger "advantage", defined as follows.

Definition 4 Let POW be a sound proof of work, and w be the minimum value such that POW is (w,l,poly(l))-feasible, where l is a security parameter. Let z be the maximum amount of computation performed by the verifier on a correct transcript for POW. The advantage of POW is equal to w/z.

Recall that one of the aims of our definitions is to consider whether it is possible for a prover to "cheat" somehow on batches of POWs. In particular, we consider whether it is possible for the prover to perform multiple, possibly interleaved proofs of work successfully with less computation than that required for performing the POWs individually. This leads us to define the notion of independence on POWs. Our definition ensures that independent POWs are not vulnerable to prover cheating in the form of batch processing.

Definition 5 Let $POW_1$ and $POW_2$ be two proofs of work for which the respective coin flips of the verifier are generated independently. Let POW' be a proof of work constructed by combining (possibly interleaving) $POW_1$ and $POW_2$. In other words, the verifier accepts for POW' if it accepts for $POW_1$ and for $POW_2$. We say that $POW_1$ and $POW_2$ are independent if the following is true. If POW' is (w,p,m)-feasible, then for some $w_1$, $w_2$, $p_1$, and $p_2$ such that $w=w_1+w_2$ and $p=p_1p_2+o(m/poly(l))$, where l is a security parameter, it is the case that $POW_1$ is $(w_1,p_1,m)$-feasible and $POW_2$ is $(w_2,p_2,m)$-feasible.

In order to make our definitions more concrete, we now present an example of a POW. This POW is very similar to that employed in several proposed security protocols. It is also similar to the basis of our bread pudding protocol for MicroMint, which will be discussed in detail hereinafter. This POW, which we call a partial inversion proof of work (PIPOW), requires two rounds: Let h: $\{0,1\}^l \rightarrow \{0,1\}^l$ represent a one-way function. The verifier V generates a random bitstring $\chi$ of length l and computes the image $y=h(\chi)$. Let $\chi'$ be the first l-k bits of $\chi$, where $k \leq l$. V sends the pair $(\chi',y)$ to P. In order to complete the POW successfully, P must calculate a valid pre-image $\tilde{x}$ of y. It is easy to see that PIPOW is $(w,1/(2^k-w), O(1))$-feasible for any integer $w \in [0, 2^k-1]$. In addition, PIPOW is (w,p)-hard for any integer $w \in [0,2^k-1]$ and $p=1/(2^k-w)$.

Figure 2:
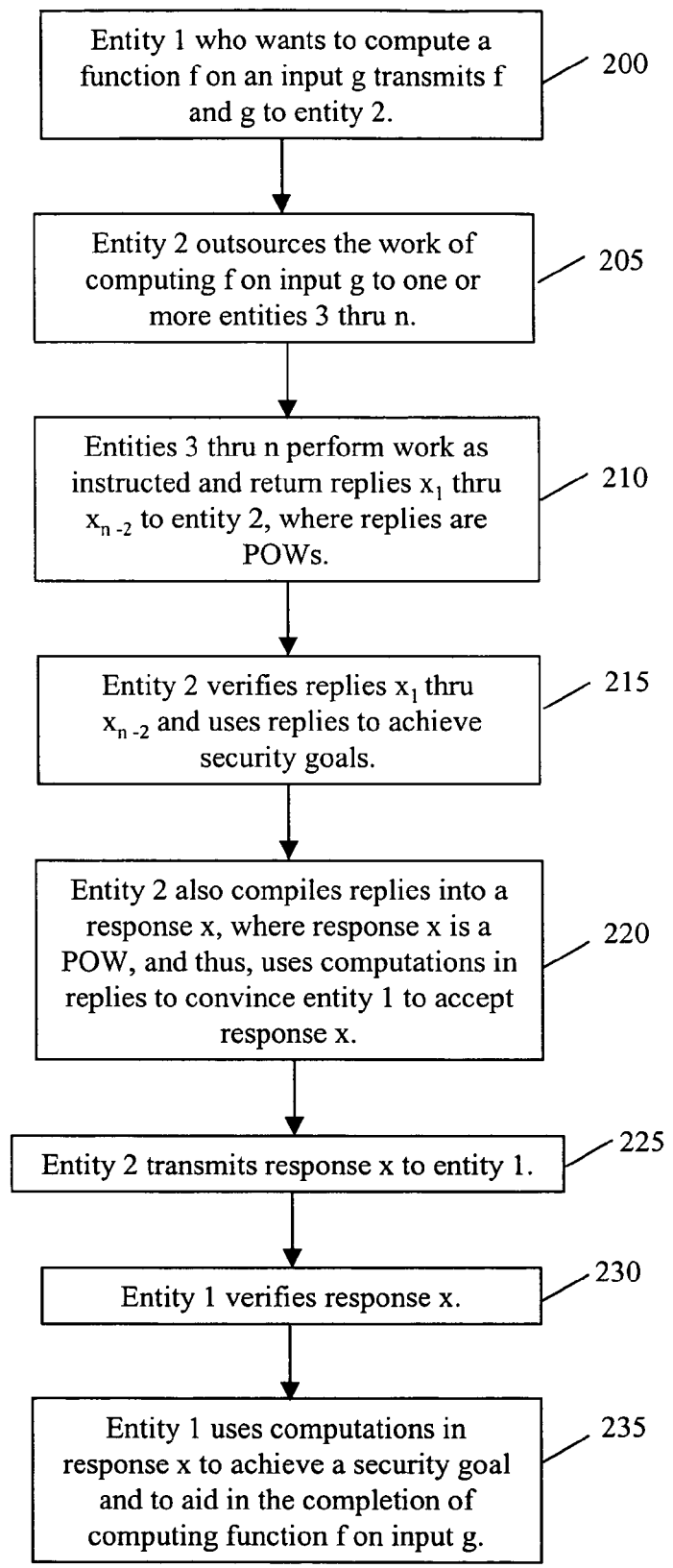
FIG. 2 is a flowchart illustrating an advantageous embodiment of the bread pudding protocol of the present invention.

FIG. 2 is a flowchart illustrating one embodiment of the bread pudding protocol of the present invention. To begin with, entity 1 wants to compute a function f on an input g, where f defines the process to be evaluated and g defines the input parameters. In step 200, entity 1 transmits the function f and input g to entity 2. In step 205, entity 2 (which, as previously mentioned, may be the same as entity 1) decides to outsource the work of computing the function f to one or more entities 3 through n. This may be accomplished by subdividing the function f and input g into $f_1, f_2, \ldots f_{n-2}$ and $g_1, g_2 \ldots g_{n-2}$, respectively, and transmitting the pair $(f_1, g_1)$ to entity 3, $(f_2, g_2)$ to entity 4, ... and $(f_{n-2}, g_{n-2})$ to entity n. Whether or not the function f is equal to $f_1, f_2 \ldots f_{n-2}$ and/or whether or not the input g is equal to $g_1, g_2 \ldots g_{n-2}$, depends upon the function f and input g to be evaluated.

In step 210, entity 3 returns its result of computing the function $f_1$ on input $g_1$ to entity 2. The value $x_1$ is the result and represents a POW (herein a "$POW_1$"). Likewise, entities 3 through n return the results of their computations, and these represent a $POW_1$ as well. It should be noted that not all of the entities may succeed. In other words, not all of the entities will have a result to return to entity 2. In any event, in step 215, entity 2 verifies replies $x_1$ through $x_{n-2}$. In step 220, entity 2 compiles the replies into a response x. The response x, like each of the replies, also constitutes a POW (herein "$POW_2$"). In step 225, entity 2 then transmits the response to entity 1. In step 230, entity 1 verifies the response by determining whether g=f(x).

In accordance with an illustrative embodiment of the present invention, the computation in $POW_1$ may be used by entity 2 in steps 215 and 220 both to achieve a security goal vis-à-vis each entity 3 through n (such as restricting resource access, benchmarking, construction of digital time capsules, and protection against spamming and other denial-of-service attacks) and, in addition, to convince entity 1 to accept $POW_2$. In step 235, entity 1 can similarly use $POW_2$ both to achieve a similar security goal and to aid in the successful completion of the task it originally sought to perform—namely, computing the function f on an input g. As we shall see, one such task is the minting of coins in a MicroMint scheme.

The bread pudding protocol of the present invention is preferably performed in a manner such that knowing ($f_1$, $x_1$, $g_1$) ... ($f_{n-2}$, $x_{n-2}$, $g_{n-2}$) or some portion thereof does not leak valuable information to the servers 3 ... n. This valuable information may be f, x, g, or some combination of these. One mechanism for maintaining privacy in such information is discussed in connection with our bread pudding protocol for MicroMint, and involves keying the function f with a secret value which prevents the provers from stealing the result of the computation (in this case, the bits that are the coins) by copying the available information.

With the foregoing in mind, we now present a definition which relates to the notion of a bread pudding protocol. Suppose that $POW_1$ is a (w,p)-hard proof of work. Let $P_1$ denote the prover involved in this proof of work, and $V_1$ the corresponding verifier. Suppose that $P_1$ is also a verifier (denoted $V_2$) in a proof of work $POW_2$, for which the prover is denoted $P_2$. We say that $POW_2$ is a bread pudding protocol for $POW_1$ if the following is true. If $P_1(=V_2)$ accepts the transcript for $POW_2$, then $P_1$ can perform w-$\epsilon$ computational steps over the duration of $POW_1$ for $\epsilon>0$, and convince $V_1$ to accept its transcript with probability at least p.

In this definition, we see that the computation that $P_2$ performs in $POW_2$ is recycled for use in $POW_1$. In a sense, we may regard $POW_2$ as an oracle for $POW_1$. A bread pudding protocol $POW_2$ is one in which this oracle reduces the computational burden of prover $P_1$ in the $POW_1$. If $POW_1$ is an implicit bread pudding protocol, then $POW_2$ may be viewed as helping to solve a computational problem, rather than aiding in successful completion of an interactive POW. Of course, trivially, if $POW_2=POW_1$, then $POW_2$ is a bread pudding protocol for $POW_1$. In order for $POW_2$ to be of interest as a bread pudding protocol, it must be efficient, in the sense that $\epsilon$ must be reasonably large. It preferably also has additional properties, such as robustness, or information hiding or divisibility, i.e., the ability to generate independent copies such that it is possible to derive useful work from multiple, independent provers. As we shall demonstrate, our bread pudding protocol for MicroMint has all of these.

In another advantageous embodiment of the present invention, we consider the computationally intensive operation of minting coins in the MicroMint scheme developed by Rivest and Shamir (See R. L. Rivest and A Shamir, "Payword and Micromint—Two Simple Micropayment Schemes", CryptoBytes, 2(1):7-11, Spring 1996). As will be discussed in detail hereinafter, in accordance with the present invention, the task of minting in the Rivest and Shamir scheme can be accomplished by partitioning the minting operation into a collection of tasks, distributing the tasks to a large group of untrusted computational devices, and harvesting the computational effort invested in POWs relating to the tasks to accomplish the minting operation. In addition, the POWs also can serve in their own right as mechanisms for security protocols, such as restricting resource access.

A "coin" in the MicroMint scheme consists of a k-way hash function collision, that is to say, a set $\{x_1, x_2, \ldots x_k\}$ of pre-images or "solutions" that map to a single image. Suppose that the hash function h used for minting maps l-bit pre-images to l-bit images. The process of finding collisions may be thought of as that of throwing balls uniformly at random into a set of $2^l$ bins. Throwing a ball corresponds in this model to choosing a pre-image x and placing it in the bin with index h(x). When k balls land in a single bin, they together constitute a coin. MicroMint's security is based on the hardness of finding hash function collisions. For forgery to be successful, it must take place on too large a scale to make the effort worthwhile.

If l is to be large enough to ensure an adequate level of security, the storage overhead associated with maintaining $2^l$ bins will be prohibitively large. Rivest and Shamir thus describe the following variation on the basic scheme. Let l=t+u. A ball (pre-image) x is considered valid only if the t least significant bits of h(x) match some pre-selected, random value s. (If invalid, the ball may be considered to miss the set of bins.) A valid ball is thrown into one of a set of $2^u$ bins, according to the value of the u most significant bits of h(x). Although the computational effort associated with minting is still high, the number of bins is smaller. It is also possible in Rivest and Shamir's scheme to key the hash function h with a secret value r that is only released on the issue date to prevent a potential forger from initiating her effort prior to a given coin issue.

Figure 3:
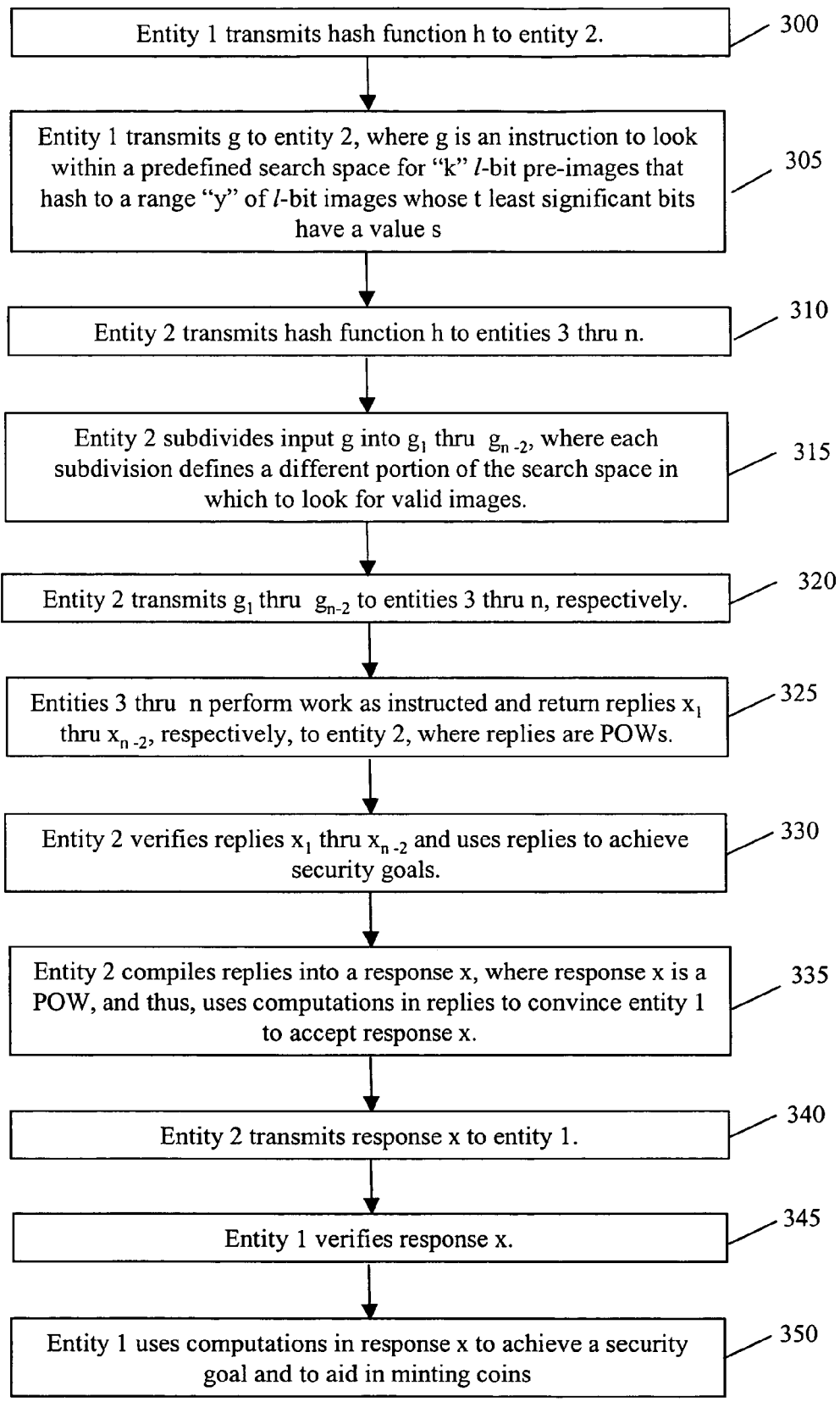
FIG. 3 is a flowchart illustrating an alternate embodiment of the present invention.

FIG. 3 is a flowchart illustrating an advantageous embodiment of the present invention in a MicroMint setting. In step 300, entity 1 transmits the hash function h to be used in identifying collisions to entity 2. In step 305, entity 1 transmits input g to entity 2, where g comprises instructions to look within a pre-defined search space for "k" l-bit pre-images that hash to a range y of l-bit images whose "t" least significant bits have the value "s", where, for security purposes, l is very large. (As mentioned above, it is also possible to key the hash function h with a secret value r as a further deterrent against forgery, as will be illustrated in yet an alternate embodiment.) For ease of illustration, suppose entity 1 elects to map 4-bit pre-images to 4-bit images, and defines the values t and s as 2 and 00, respectively. In that case, there would be sixteen possible pre-images (i.e., a search space of sixteen) and four possible images whose 2 least significant bits are 00. The four possible images would correspond to the "bins" into which a valid pre-image or "ball" is "thrown" using hash function h.

In step 310, entity 2 transmits the hash function h to entities 3 through n. In step 315, entity 2 subdivides input g into $g_1, g_2, \ldots g_{n-2}$, where each subdivision $g_{n-2}$ defines a subset of the pre-image search space in which to look for values that hash to the range "y" of images whose "t" least significant bits have the value "s". Thus, each entity 3, 4, . . . n, would be assigned a different portion of the pre-image search space in which to search. For example, in a search space of sixteen 4-bit pre-images (once again, chosen for ease of illustration), entity 3 may be assigned pre-images 0000 through 0011 to search, entity 4 may be assigned 0100 through 0111, etc., until the entire pre-image search space has been assigned. In step 320, entity 2 transmits inputs $g_1$ through $g_{n-2}$ to entities 3 through n, respectively.

In step 325, entities 3, 4, . . . n transmit replies $x_1$, $x_2$, . . . $x_{n-2}$ to entity 2. Each of these replies comprises a POW. If entities 3 through n are successful (not all may succeed), each reply will be an l-bit pre-image that hashes to an l-bit image within the pre-defined range y or, in other words, to a valid ball. The l-bit pre-image is a POW (referred to herein as $POW_1$). In step 330, entity 2 verifies the replies $x_1$ through $x_{n-2}$. In step 335, entity 2 compiles k replies into a response x. The response x is also a POW (referred to herein as $POW_2$). In step 340, entity 2 transmits the response to entity 1. In step 345, entity 1 verifies the response by determining whether y=f(x), or, in other words, by determining whether x hashes to an image within the specified range y.

The computation in $POW_1$ may then be used by entity 2 in step 335 to achieve acceptance of $POW_2$ by entity 1. Similarly, in step 350, entity 1 can use the computation performed in $POW_2$ to aid in the successful completion of the task it originally sought to perform—namely, finding k pre-image values that hash to the specified range for purposes of minting coins. In addition, as shown in steps 330 and 350, these POWs can also be used to achieve a separate security goal, such as restricting resource access.

Figure 4:
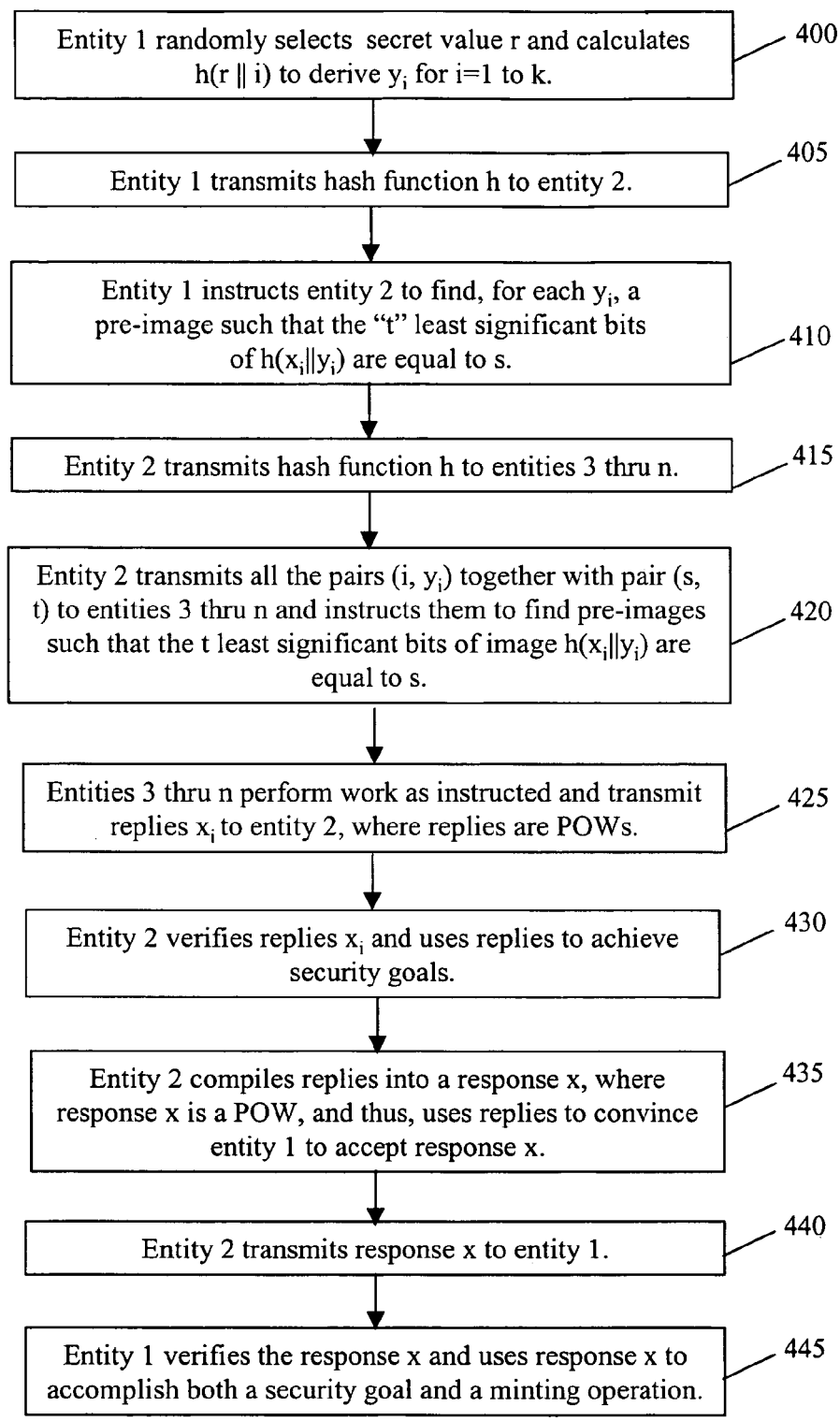
FIG. 4 is a flowchart illustrating yet another embodiment of the present invention.

FIG. 4 illustrates yet another advantageous embodiment of the present invention. Once again, this embodiment is presented in the context of a bread pudding protocol for the MicroMint minting operation. As will be discussed in detail hereinafter, this bread pudding protocol is robust and independent (as defined above), and, in addition, possesses information hiding properties.

Let h be a suitable hash function and ∥ denote string concatenation. In step 400, entity 1 randomly selects a secret value "r" specific to each coin to be minted and calculates h(r∥i) to derive $y_i$ for i=1 to k. The value "i" is a counter used by the parties to identify a particular pre-image or "ball" (i.e., $1^{st}$, $2^{nd}$, . . . $k^{th}$); where k balls constitute a coin, as will be described further hereinafter. In one embodiment, the secret value "r" is augmented with a portion specific to the period of the coin's validity as an additional measure of security. Alternatively, the period of validity may simply be an additional value μ to be concatenated with the values r and i in deriving images $y_i$. In step 405, entity 1 transmits hash function h to entity 2 (if h is not a well-known hash function previously agreed to by the parties). In step 410, entity 1 instructs entity 2 to find, for each $y_i$, a pre-image value $x_i$, such that $h(x_i\|y_i)$ is equal to a target value "s". In our illustrative embodiment, entity 1 instructs entity 2 to find pre-image values where the "t" least significant bits of $h(x_i\|y_i)$ are equal to s. In this embodiment, the "bin" into which a ball is thrown is determined by the u most significant bits of $h(x_i\|y_i)$.

In step 415, entity 2, in turn, transmits hash function h to entities 3, 4 . . . n (if not already known by these entities). In step 420, entity 2 transmits all of the pairs (i, $y_i$) together with pair (s, t) to entities 3, 4, . . . n, and instructs them to find pre-image values such that the t least significant bits of $h(x_i\|y_i)$ are equal to s. Entity 2 also may instruct each entity 3, 4, . . . n to search for collisions in a different pre-image search space, thereby avoiding any overlap in effort. In step 425, entities 3 through n transmit replies $x_i$ to entity 2. It may be the case that not all of these entities have replies to return. For those that do, however, the replies are in the form of a triple (i, $x_i$, $y_i$). The replies are POWs, each of which requires an average computational effort of $2^{t-1}$ hashes for the prover. In fact, it may be seen that these are (w, $1/(2^t-w)$, O(1))-feasible and also (w, $1/(2^t-w)$)-hard POWs, in accordance with the definitions and example discussed in detail above.

In step 430, entity 2 checks the validity of each ball. This involves a single hash to verify that the least significant t bits of $h(x_i\|y_i)$ are equal to s. In step 435, entity 2 compiles the replies into a response and, in step 440, transmits the response to entity 1. The response is also a POW. In step 445, entity 1 verifies the response using two hashes for each ball: one hash using the secret value r to verify that $y_i$=h(r∥i); and one hash to verify that the least significant t bits of $h(x_i\|y_i)$ are equal to s.

Once entity 1 has collected "k" valid balls (i.e., $x_1$, $x_2$, . . . $x_k$), he is in possession of a coin (assuming entity 1 defined a coin as a "k"-way collision), and thus, has successfully shifted the burden of the minting operation onto a large group of untrusted computational devices by partitioning the minting operation into a collection of POWs.

In accordance with the present invention, the computations in the POWs received from entities 3 through "n" may be used by entity 2 in step 435 to convince entity 1 to accept its POW. Similarly, in step 445, entity 1 can use the computation performed in entity 2's POW to aid in the successful completion of the task of finding the requisite number of pre-image values that hash to the specified range of images for the purpose of minting coins. In addition, as shown in steps 430 and 445, and previously mentioned, these POWs can also be used to achieve a separate security goal.

It will be appreciated that the secret value r is not revealed in a POW. Thus, even when minting is performed by way of POWs, this secret value need only be released on the day of coin issue (so as to permit the public to verify the validity of the coin). In particular, an adversary sees only the valid balls that he himself computes or which he has access to through colluding parties. Unless he can collect the vast majority of valid balls, though, the minting operation remains infeasible for him. In particular, it is infeasible for him to obtain r and create new balls. Observe also, that the POWs in this scheme, assuming that h has random-oracle like properties, are independent.

Rivest and Shamir propose sample parameters in their paper of k=4, l=52, and t=21 for achieving a viable minting setup. Thus, the POW based on finding a valid ball requires an average of $2^{20}$ hash operations for the prover. This is, as it happens, exactly the hardness of the POW proposed in E. Gabber et al., "Curbing Junk E-mail Via Secure Classification", Financial Cryptography '98, Springer-Verlag, 1998, requiring about 2 seconds on a 266 MHz Pentium II processor under the hash function MD5. If the minter offloads the problem of finding valid balls onto clients, then his own computational effort is equal to at most two hashes per ball: two for verification, of which one determines which bin a given ball belongs in. Given the number $k2^u=2^{33}$ of balls suggested by the heuristic calculations in the Rivest and Shamir paper, the minter would thus have to perform $2^{34}$ hash function computations. This can be computed in well less than a day on a standard workstation with sufficient available memory. Without outsourcing the minting operation, the minter would be forced to perform roughly $2^{53}$ hash function computations on average.

Altogether, a set of $2^{33}$ POWs requiring an average of 2 seconds of computation apiece represents a substantial amount of computation to offload onto clients. With one million clients, for instance, it would be necessary for each client to perform almost five hours of computation to complete the solution of all POWs. In many cases—as when clients can perform computation overnight using idle cycles—this is reasonable. Nonetheless, in some scenarios, as when clients are very low power devices, it may be desirable to make the POWs somewhat easier. We can do this as follows. Let us require that z in a valid ball have v leading "0" bits, and that only the first t-v bits in $h(x\|z)$ be equal to a value s. Now a POW requires only $2^{t-v-l}$ hash computations on average for a client. A POW, of course, is harder for the minter in this case: the minter effectively compensates for the reduced computational burden on clients by performing substantially more computation itself. The memory requirements in this variant of our scheme, however, are unchanged.

It will be evident to those skilled in the art that variants are possible on the basic distributed MicroMint scheme disclosed herein that rely on different cryptographic primitives. For example, a coin might consist of an RSA or Rabin-Williams digital signature. These digital signatures are well-known in the art. A portion of the task of generating the signature might then be distributed in a securely blinded fashion to one or more potentially untrusted entities. One mechanism of accomplishing this blind distribution in order to generate a signature on a message m in a public modulus n would be to have the one or more untrusted entities compute $m^k$ for a range of fixed exponents k. The minter could then combine these to produce a signature on m with substantially less work than would be required to produce the signature independently.

Given the present disclosure, it will be understood by those of ordinary skill in the art that the above-described bread pudding protocol of the present invention may be readily implemented using one or more computer processors in communication with one or more memory devices having embodied therein stored programs for performing the method of the present invention.

The many features and advantages of the present invention are apparent from the detailed specification, and thus, it is intended by the appended claims to cover all such features and advantages of the invention which fall within the true spirit and scope of the invention.

Furthermore, since numerous modifications and variations such as the one described above will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. A method of using a computational effort invested in a proof of work (POW), the method executable in one or more processors in communication with one or more memory devices having embodied therein stored programs for performing the method, comprising:
    distributing a computational task among a plurality of entities for execution within a specified interval of time as a POW;
    receiving the POW relating to said task from one of said plurality of entities;
    using said POW to accomplish said task; and
    distribution of the POW as a POW.

2. The method of claim 1 further comprising using said POW to accomplish a security goal.

3. The method of claim 2 wherein said security goal involves restricting resource access by said one of said plurality of entities.

4. The method of claim 1, wherein distributing said task among a plurality of entities includes partitioning said task into a plurality of sub-computational tasks and distributing each one of said plurality of sub-computational tasks to a respective one of said plurality of entities.

5. A method of using a computational effort invested in a proof of work (POW), the method executable in one or more processors in communication with one or more memory devices having embodied therein stored programs for performing the method, comprising:
    partitioning a minting operation into a plurality of sub-computational tasks;
    distributing one of said plurality of sub-computational tasks to one of a plurality of entities;
    receiving a POW from said one of said plurality of entities;
    using said POW to accomplish said minting operation; and
    distribution of the POW as a POW.

6. The method of claim 5 further comprising using said POW to accomplish a security goal.

7. The method of claim 6 wherein said predetermined image comprises a range of images.

8. The method of claim 7 wherein all images within said range of images have a predetermined number of least significant bits in common.

9. The method of claim 6 wherein said security goal involves restricting resource access.

10. The method of claim 5 wherein said minting operation includes identifying valid solutions that hash to a predetermined image and wherein said POW represents a valid solution.

11. The method of claim 10 further comprising verifying said valid solution by determining whether said valid solution represented by said POW hashes to said predetermined image.

12. The method of claim 5 wherein each of said sub-tasks comprises searching a different solution search space for valid solutions.

13. A method of using a computational effort invested in a proof of work (POW), the method executable in one or more processors in communication with one or more memory devices having embodied therein stored programs for performing the method, comprising:
    distributing a minting operation among a plurality of entities in a manner that maintains privacy in said minting operation;
    receiving a POW from said one of said plurality of entities relating to said minting operation;
    using said POW to accomplish said minting operation; and
    distribution of the POW as a POW.

14. The method of claim 13 further comprising using said POW to accomplish a security goal.

15. The method of claim 13 wherein said minting operation comprises using a hash function to identify a predetermined number of valid solutions that hash to a target value and wherein said POW represents a valid solution.

16. The method of claim 15 wherein said predetermined number of valid solutions comprise a coin.

17. The method of claim 15 wherein said predetermined number of valid solutions hash to a portion of said target value.

18. The method of claim 15 wherein said privacy is maintained in said minting operation by keying said hash function with a secret value.

19. The method of claim 18 wherein said secret value includes a portion specific to a coin.

20. The method of claim 19 wherein said secret value includes a portion specific to a period of said coin's validity.

21. The method of claim 18 wherein said hash is of a concatenation of a solution and a value generated using said secret value.

22. The method of claim 13 wherein said distributing includes instructing each of said plurality of entities to search within a different search space for valid solutions.

23. The method of claim 13 further comprising verifying said POW.

24. A method of using a computational effort invested in a proof of work (POW), the method executable in one or more processors in communication with one or more memory devices having embodied therein stored programs for performing the method, comprising:
  generating a computational task for a certain amount of intense computation in a specified period of time as a POW to accomplish a separate, useful and verifiable correct computation;
  distributing the computational task for execution among a plurality of server entities receiving a POW relating to said task from one of said plurality of said server entities;
  using said POW to verify and accomplish said computational task; and
  distribution of the POW as a POW.

25. The method of claim 24 wherein the proof of work POW is hard if prover P with memory resources bounded by m performs an average, over all coin flips by P and a verifier V, of at most w steps of computation in the time interval $[t_s, t_c]$, and the verifier V accepts with probability at most $$p + o\left(\frac{m}{poly(l)}\right),$$

where l is a security parameter, is start time and tc is complete time.

26. The method of claim 24 wherein a proof of work POW is feasible if there exists a prover P with memory resources m, such that with an average of w steps of computation in the time interval $[t_s, t_c]$, the prover can cause a verifier V to accept with probability at least p.

27. The method of claim 24 wherein a proof of work POW is sound, if, for some steps of computation (w), POW is (w, l, poly(l))-feasible, where l is a security parameter.

28. The method of claim 27 wherein a POW may be regarded as efficient wherein w is less than z the maximum amount of computation performed by a verifier on a correct transcript for the POW.

29. A method of using a computational effort invested in a proof of work (POW), the method executable in one or more processors in communication with one or more memory devices having embodied therein stored programs for performing the method, comprising:
  a first entity distributing a computational task among a plurality of second entities for execution within a specified interval of time as a POW;
  receiving at the first entity the POW relating to said task from one of said plurality of entities;
  using said POW by the first entity to accomplish said task; and
  re-using of the POW as a POW in another task.

30. A method of using a computational effort invested in a proof of work (POW), the method executable in one or more processors in communication with one or more memory devices having embodied therein stored programs for performing the method, comprising:
  a first entity partitioning a minting operation into a plurality of sub-computational tasks; distributing one of said plurality of sub-computational tasks by the first entity to one of a plurality of second entities;
  receiving at the first entity a POW from said one of said plurality of entities;
  using said POW by the first entity to accomplish said minting operation; and
  re-using of the POW as a POW in another task.

31. A method of using a computational effort invested in a proof of work (POW), the method executable in one or more processors in communication with one or more memory devices having embodied therein stored programs for performing the method, comprising:
  generating a computational task by a first server for a certain amount of intense computation in a specified period of time as a POW to accomplish a separate, useful and verifiable correct computation;
  distributing the computational task by the first server for execution among a plurality of second servers;
  receiving at the first server a POW relating to said task from one of said plurality of said second servers;
  using said POW by the first server to verify and accomplish said computational task; and
  re-using of the POW as a POW in another task.

* * * * *